(12) United States Patent
Harris et al.

(10) Patent No.: US 6,598,130 B2
(45) Date of Patent: Jul. 22, 2003

(54) TECHNIQUE FOR REFERENCING DISTRIBUTED SHARED MEMORY LOCALLY RATHER THAN REMOTELY

(75) Inventors: Kevin W. Harris, Nashua, NH (US); Brian F. Wibecan, Acton, MA (US); John A. Bircsak, Acton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1 day.

(21) Appl. No.: 09/918,251

(22) Filed: Jul. 30, 2001

(65) Prior Publication Data

US 2002/0087813 A1 Jul. 4, 2002

Related U.S. Application Data

(60) Provisional application No. 60/221,772, filed on Jul. 31, 2000.

(51) Int. Cl.[7] .............................................. G06F 12/00
(52) U.S. Cl. ........................ 711/147; 711/170; 711/202; 709/214
(58) Field of Search ......................... 709/201, 213–217; 712/13, 14, 28; 711/147, 170, 148, 153, 202

(56) References Cited

U.S. PATENT DOCUMENTS

| | | | | |
|---|---|---|---|---|
| 5,117,350 A | * | 5/1992 | Parrish et al. .................. 711/1 |
| 6,209,065 B1 | * | 3/2001 | Van Doren et al. ......... 711/130 |
| 6,226,671 B1 | * | 5/2001 | Hagersten et al. .......... 709/215 |
| 6,249,802 B1 | * | 6/2001 | Richardson et al. ........ 709/200 |
| 6,266,745 B1 | * | 7/2001 | de Backer et al. .......... 711/147 |
| 6,289,424 B1 | * | 9/2001 | Stevens ....................... 711/147 |
| 6,336,170 B1 | * | 1/2002 | Dean et al. .................. 711/147 |
| 6,370,585 B1 | * | 4/2002 | Hagersten et al. .......... 709/213 |

* cited by examiner

Primary Examiner—Hong Kim

(57) ABSTRACT

The invention comprises a technique for allocating memory in a multiprocessing computing system. In a first aspect, a method in accordance with the present invention begins by collecting a plurality of descriptions of shared data items. The shared data items are then dynamically allocated into a local virtual address space shared by a plurality of CPUs within a single node. The description of this allocation is the then stored. The method then accesses the stored allocation description to determine the virtual memory address of a shared data item. Whenever a data request is generated, it is determined from this virtual memory address whether the shared data item is available within the shared local virtual address space. If so, the access is performed in the shared local virtual address space. If the data is unavailable in the local virtual address space, it is accessed from a remote memory space.

22 Claims, 3 Drawing Sheets

Naive allocation of shared arrays A and B on nodes 0-3

TECHNIQUE FOR REFERENCING DISTRIBUTED SHARED MEMORY LOCALLY RATHER THAN REMOTELY

BACKGROUND OF THE INVENTION

We claim the earlier effective filing date of U.S. Provisional Application No. 60/221,772, filed Jul. 31, 2000.

FIELD OF THE INVENTION

The present invention pertains to memory management and utilization in large scale computing systems and, more particularly, to an improved technique for referencing distributed shared memory.

DESCRIPTION OF THE RELATED ART

Even as the power of computers continues to increase, so does the demand for ever greater computational power. In digital computing's early days, a single computer comprising a single central processing unit ("CPU") executed a single program. Programming languages, even those in wide use today, were designed in this era, and generally specify the behavior of only a single "thread" of computational instructions. Computer engineers eventually realized that many large, complex programs typically could be broken into pieces that could be executed independently of each other under certain circumstances. This meant they could be executed simultaneously, or "in parallel."

Thus, the advent of parallel computing. Parallel computing typically involves breaking a program into several independent pieces, or "threads," that are executed independently on separate CPUs. Parallel computing is sometimes therefore referred to as "multiprocessing" since multiple processors are used. By allowing many different processors to execute different processes or threads of a given application program simultaneously, the execution speed of that application program may be greatly increased.

In the most general sense, multiprocessing is defined as the use of multiple processors to perform computing tasks. The term could apply to a set of networked computers in different locations, or to a single system containing several processors. As is well-known, however, the term is most often used to describe an architecture where two or more linked processors are contained in a single enclosure. Further, multiprocessing does not occur just because multiple processors are present. For example, having a stack of PCs in a rack serving different tasks, is not multiprocessing. Similarly, a server with one or more "standby" processors is not multiprocessing, either. The term "multiprocessing", therefore, applies only when two or more processors are working in a cooperative fashion on a task or set of tasks.

In theory, the performance of a multiprocessing system could be improved by simply increasing the number of processors in the multi-processing system. In reality, the continued addition of processors past a certain saturation point serves merely to increase communication bottlenecks and thereby limit the overall performance of the system. Thus, although conceptually simple, the implementation of a parallel computing system is in fact very complicated, involving tradeoffs among single-processor performance, processor-to-processor communication performance, ease of application programming, and managing costs. Conventionally, a multiprocessing system is a computer system that has more than one processor, and that is typically designed for high-end workstations or file server usage. Such a system may include a high-performance bus, huge quantities of error-correcting memory, redundant array of inexpensive disk ("RAID") drive systems, advanced system architectures that reduce bottlenecks, and redundant features such as multiple power supplies.

Parallel computing embraces a number of computing techniques that can be generally referred to as "multiprocessing" techniques. There are many variations on the basic theme of multiprocessing. In general, the differences are related to how independently the various processors operate and how the workload among these processors is distributed.

Two common multiprocessing techniques are symmetric multiprocessing systems ("SMP") and distributed memory systems. One characteristic distinguishing the two lies in the use of memory. In an SMP system, at least some portion of the high-speed electronic memory may be accessed, i.e., shared, by all the CPUs in the system. In a distributed memory system, none of the electronic memory is shared among the processors. In other words, each processor has direct access only to its own associated fast electronic memory, and must make requests to access memory associated with any other processor using some kind of electronic interconnection scheme involving the use of a software protocol. There are also some "hybrid" multiprocessing systems that try to take advantage of both SMP and distributed memory systems.

SMPs can be much faster, but at higher cost, and cannot practically be built to contain more than a modest number of CPUs, e.g, a few tens. Distributed memory systems can be cheaper, and scaled arbitrarily, but the program performance can be severely limited by the performance of the interconnect employed, since it (for example, Ethernet) can be several orders of magnitude slower than access to local memory.) Hybrid systems are the fastest overall multiprocessor systems available on the market currently. Consequently, the problem of how to expose the maximum available performance to the applications programmer is an interesting and challenging exercise. This problem is exacerbated by the fact that most parallel programming applications are developed for either pure SMP systems, exploiting, for example, the "OpenMP" ("OMP") programming model, or for pure distributed memory systems, for example, the Message Passing Interface ("MPI") programming model.

However, even hybrid multiprocessing systems have drawbacks and one significant drawback lies in bottlenecks encountered in retrieving data. In a hybrid system, multiple CPUs are usually grouped, or "clustered," into nodes. These nodes are referred to as SMP nodes. Each SMP node includes some private memory for the CPUs in that node. The shared memory is distributed across the SMP nodes, with each SMP node including at least some of the shared memory. The shared memory within a particular node is "local" to the CPUs within that node and "remote" to the CPUs in the other nodes. Because of the hardware involved and the way it operates, data transfer between a CPU and the local memory can be 10 to 100 times faster than the data transfer rates between the CPU and the remote memory.

This performance problem is exacerbated by the manner in which programming is performed on such computing systems. Typically, programming languages permit a programmer to specify which data items (e.g., arrays and scalars) are stored in local and shared memory. However, programming languages and operating systems strive to make the difference between local and remote shared memory transparent to the programmer. While this greatly simplifies the programming effort, it also masks from the programmer the performance difference between local and remote memory utilization for shared data items.

An alternative technique designs the programming environment so that the programmer can distinguish, in the program source code, the difference between accessing shared memory within an SMP node, and remote memory in the other nodes of the hybrid systems. One such method is to use both the OpenMP and MPI programming models in the same program. The main drawback is that even simple programs become exceedingly complex and error prone when this technique is used.

Thus, there is a strong design motivation to keep the allocation of memory for shared data items between local and remote memories beyond the programmer's reach. The allocation of shared data items is, in fact, frequently undertaken without regard to whether the allocated memory will be local or remote to the CPU that will be using the data item. Consequently it is often difficult, for a programmer of parallel applications to realize the potential performance gains that might result from tighter control over whether CPU accesses for shared data items are made to local, rather than remote, shared memory.

The present invention is directed to resolving, or at least reducing, one or all of the problems mentioned above.

SUMMARY OF THE INVENTION

The invention comprises a technique for allocating memory in a multiprocessing computing system. In a first aspect, a method in accordance with the present invention begins by collecting a plurality of descriptions of shared data items. The shared data items are then dynamically allocated into a local address space shared by a plurality of CPUs within a single node. The description of this allocation is the then stored. The method then accesses the stored allocation description to determine the memory address of a shared data item. Whenever a data request is generated, it is determined from this memory address whether the shared data item is available within the shared local address space. If so, the access is performed in the shared local address space. If the data is unavailable in the local address space, it is accessed from a remote memory space.

BRIEF DESCRIPTION OF THE DRAWINGS

The invention may be understood by reference to the following description taken in conjunction with the accompanying drawings, in which like reference numerals identify like elements, and in which.

Figure 1:
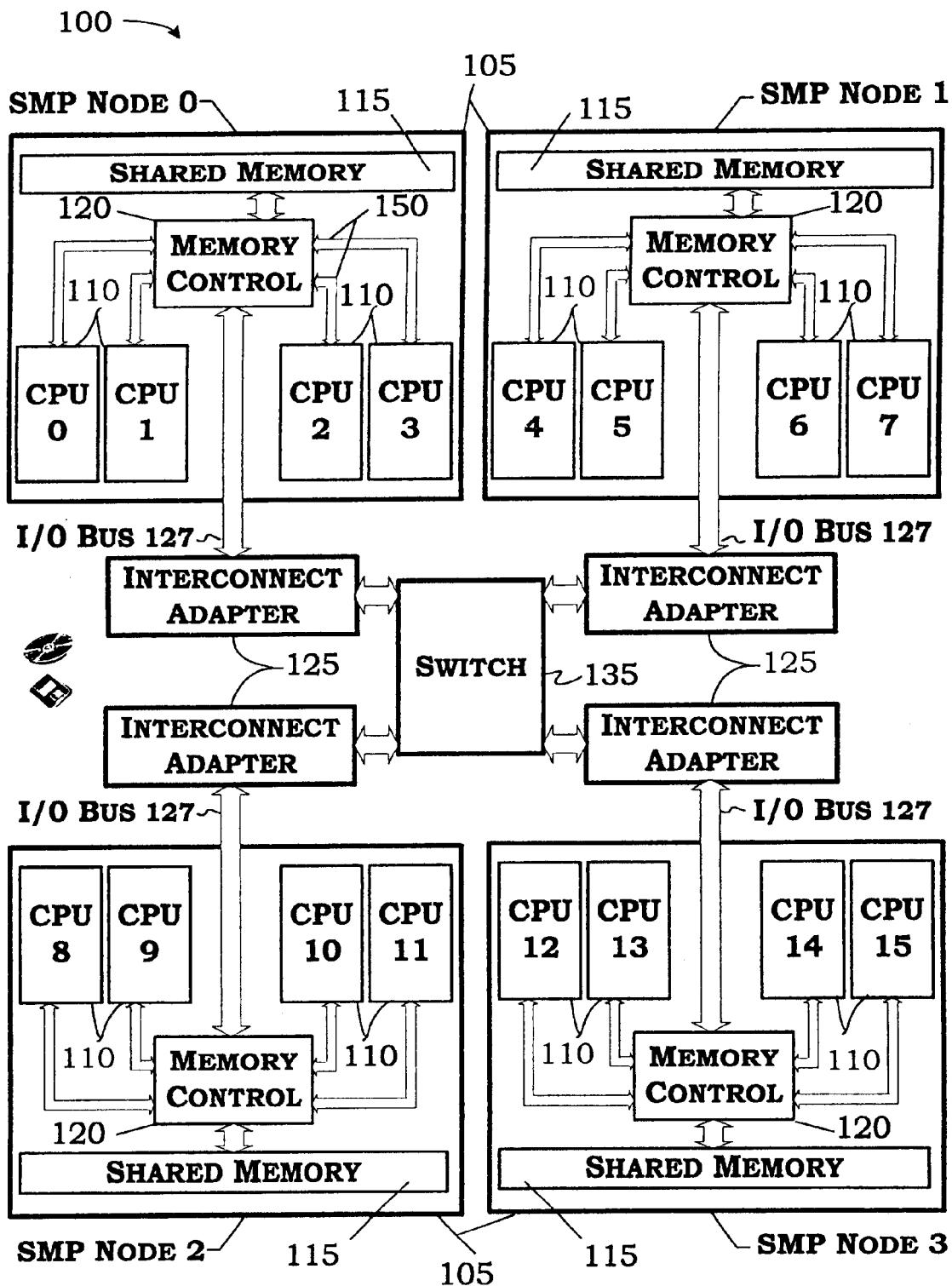
FIG. 1 depicts a computing system configured and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will be appreciated that, in the development of any such actual embodiment, numerous implementation-specific decisions must be made to achieve the developers' specific goals. Such details might include compliance with system-related and business-related constraints, which will vary from one implementation to another, for instance. Moreover, it will be appreciated that such a development effort, even if complex and time-consuming, would be a routine undertaking for those of ordinary skill in the art having the benefit of this disclosure.

FIG. 1 depicts one particular implementation of a computing system 100 configured and operated in accordance with the present invention. The computing system 100 is, in this particular embodiment, a hybrid computing system exhibiting characteristics of both an SMP computing system and a distributed memory computing system. The computing system 100 comprises a plurality of SMP nodes 105, and each SMP node 105 includes a plurality of CPUs 110 connected to a common shared memory system 115 via a memory control unit 120. Each memory control unit 120 also allows access, via an input/output ("I/O") bus 127, to an interconnect adapter 125. The interconnect adapters 125 allow each SMP node 105 to communicate with the switch 135 to access memory locations on the other SMP nodes 105 in the computing system 100. In one particular embodiment, the computing system 100 comprises a "cluster."

The CPUs 110 of each SMP node 105 communicate over a bus 150. The information on the buses 150 flows at higher rates and with lower latencies, than the information flowing on the I/O bus 127 and through the switch 135. Typically, local accesses via the local memory controller 120, are 10 to 100 times faster than memory accessed via the switch 135 or even the interconnect adapters 125. Thus, it is highly desirable to access data from the shared memory 115 within the same SMP node 105 through the local memory controller 120 rather than from a remote memory in another SMP node 105.

The computing system 100 may employ any suitable operating system ("OS") to control and direct its operations, e.g., a Windows, UNIX, or disk operating system ("DOS")-based OS. A copy of the OS executes in each of the SMP nodes 105, and the copies work cooperatively to execute programmed tasks. One particular implementation employs the Tru64 UNIX OS. This OS includes two allocation functions, i.e., the shmget( ) and shmat( ) allocation functions, that are useful in implementing the invention as is discussed further below. However, the invention is not so limited.

The computing system 100 also includes, in this embodiment, a programming language compiler, not shown, that may execute on any individual CPU 110 in the computing system 100. In some embodiments, the compiler might not even reside on the computing system 100, but may instead reside on some other computing system (not shown) compatible with the CPUs 110. Where the programming language compiler resides on a compatible computing system other than the computing system 100, the compiled user program must be relocated to the computing system 100.

The compiler translates programs written in high level source languages that people can understand (e.g., C++, FORTRAN, etc.) into machine code that the CPUs 110 of the computing system 100 can directly execute. The principles of compiling code in this fashion are well known. See Alfred V. Aho et al., *Compilers Principles, Techniques and Tools* (Addison-Wesley Publishing Co., Reading, Mass.) (ISBN 0-201-10088-6). As will be appreciated by those in the art having the benefit of this disclosure, a compiler is, to some degree, implementation specific. The compiler must be able to read the high level source code, and thus be specific as to the source language, and translate it for the CPU model used, and thus be CPU specific, and into a binary format for the OS, and thus be OS specific.

One task a compiler commonly performs during the compilation task is memory allocation. In the implementation employing the Unified Parallel C ("UPC") Programming Language, for instance, a programmer declares whether certain data items (e.g., arrays and scalars) are "shared" or "private." This declaration determines whether the data item will be stored in shared memory (i.e., memory that all of the CPUs 110 can access) or in private memory (i.e., memory accessible only to the program executed by an individual CPU 110) when the program being compiled is subsequently executed. A conventional compiler, at that time, allocates the memory for those shared data items and stores in that allocated space a "complete" description of that shared data item. The complete description will usually include the name, size, address, and alignment for the respective shared data item.

In the present invention, however, the compiler is modified so that this does not happen for shared data items. Memory for private data items is allocated in conventional fashion during compilation. However, for shared data items, the compiler in the present invention instead allocates a partially complete description for the data item. The description is only partially complete because it does not contain the address of the allocation, which has not yet occurred. The allocation of memory for the shared data item is made at run-time, ie., dynamically, during the initialization step for program execution. This has many advantages manifested in the present invention as will be disclosed below.

More technically, the compiler allocates space for "descriptions" of the relevant data items in private memory. As part of the initialization sequence, the compiled code stores into these descriptions, the name, size, and alignment information appropriate for each data item, but not its address. Then, the description is added to a list of such descriptions whose location has been previously agreed upon between the compiled code and the Run-Time System ("RTS") used to perform the allocation steps. User programs can be embodied in many separate "modules" that are compiled independently. During the initialization step, each module contributes its descriptions to this list. Other methods of communicating these descriptions to the RTS could be used.

After all the program's modules have contributed their descriptions, execution control is given to the RTS portion of the initialization sequence. This RTS portion examines the data sizes, alignments, etc. specified in the descriptions, sums them, allocates sufficient shared memory using function(s) provided by the OS for allocating shared memory dynamically (e.g., shmget( ) and shmat( ), in the case of UNIX) to encompass all the data items used by the program, then computes the fragment of this shared memory that will be used for each individual data item. The particular dynamic allocation used will be implementation specific, and one particular implementation is discussed further below. The RTS then stores the address of this fragment into the description associated with the fragment. This portion of the initialization sequence is now complete, and, after the remainder of the initialization sequence, control then passes to the compiled code for the user's program proper.

In this particular implementation, the computing system 100 employs the Tru64 UNIX OS and the compiler is one developed to support the UPC programming language on AlphaServer-SC computer systems employing this OS. The compiler is modified to recognize and implement the option specifying this type of compilation at the time the program is compiled. More particularly, the user specifies a —smp_ local option at the time the program is compiled.

The compiler than allocates a partially complete description rather than memory space for the shared data items in accordance with the present invention. The compiler, as noted above, allocates complete descriptions for private data items. More particularly, for shared data items, the compiler provides a set of descriptions of the names, sizes, and alignments required for the data items which will participate in the shared memory communications operations, but not the addresses. Note that one advantage of this implementation is that pre-existing UPC language programs may be ported to computing systems employing the invention without having to be rewritten to accommodate the new functionality it provides.

The computing system 100 is but one hardware implementation that may be configured and operated in accordance with the present invention. The invention admits wide variation in this aspect. For instance, as mentioned, the computing system 100 is a hybrid system, but the invention may be practiced in pure SMP and pure distributed memory systems. Furthermore, the diagram shows four SMP nodes, each directly connected to a single switch for simplicity, but many other configurations of SMP nodes and switches are possible, including configurations with hundreds of processors and multiple switches. Likewise, the SMP nodes 105 may include more, or fewer, CPUs 110. Thus, the computing system 100 is but one example, and many other hardware implementations may be employed.

Figure 2:
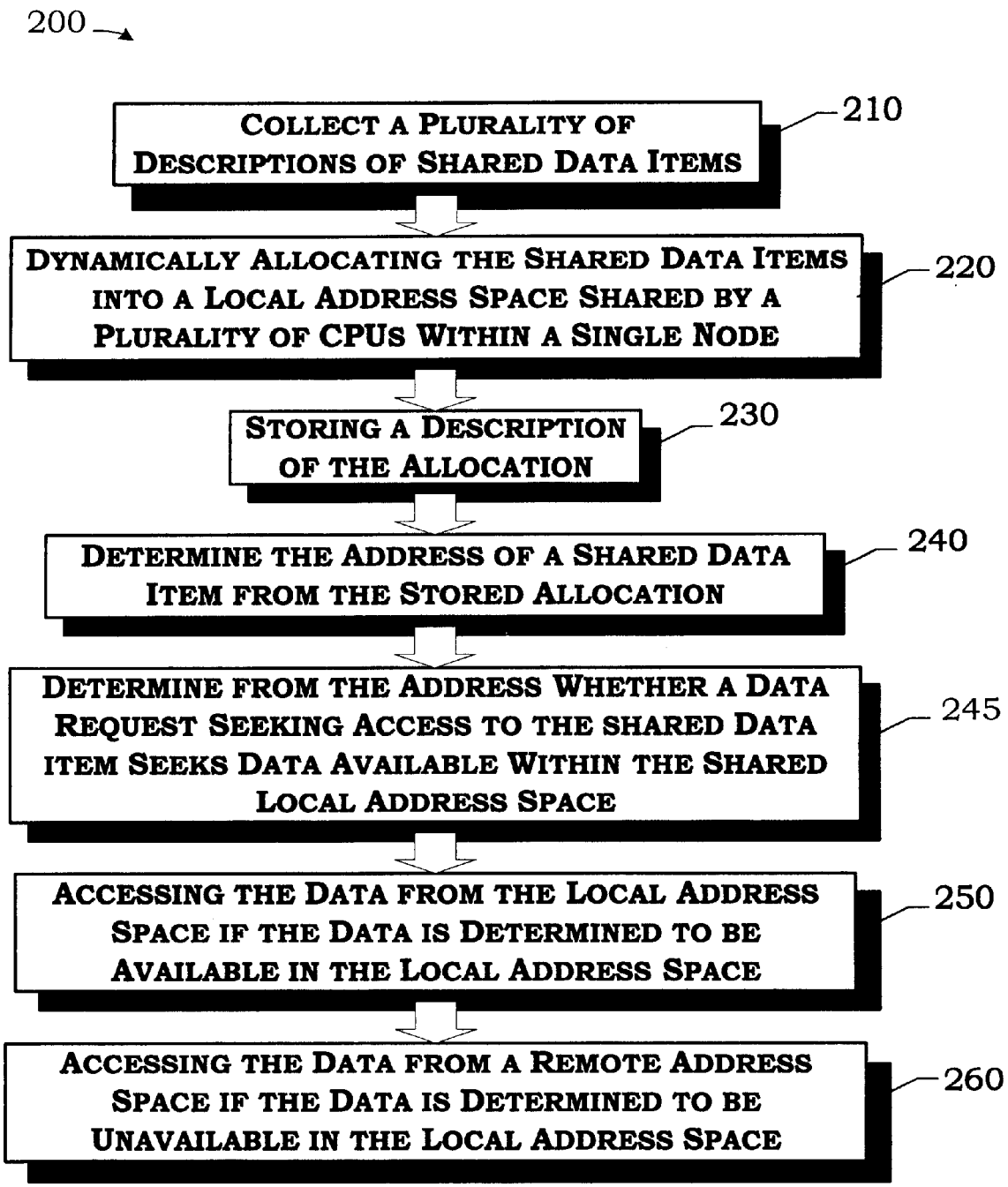
FIG. 2 illustrates a method for performing remote memory transactions in a computing system such as the computing system of FIG. 1 in accordance with the present invention.

FIG. 2 illustrates a method 200 for performing remote memory transactions in a computing system such as the computing system 100. To further an understanding of the present invention, the method 200 will be disclosed in the context of the computing system 100. However, the method 200 may be implemented on a variety of computing systems other than the particular implementation in FIG. 1. Note also that the method 200 is a software implemented method. Thus, in some aspects, the invention comprises a program storage medium encoded with the software capable of implementing the method and/or a computer programmed to implement the method. The program storage medium may be electronic, magnetic, such as the floppy disk 140 in FIG. 1, or optical, such as the compact disk, read only memory ("CDROM") 145, also in FIG. 1, or some other type of medium capable of storing the computer instructions.

Some portions of the detailed descriptions herein are consequently presented in terms of a software implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Returning now to FIG. 2, the method 200 begins at the time the execution of the compiled program is commencing on each CPU 110 by collecting a plurality of partially complete descriptions of programmer-specified shared data items, as set forth in the box 210. Note that, in some embodiments, partially complete descriptions for compiler-specified shared data items might also be collected. For instance, a compiler might, as part of some code optimization, copy a programmer-specified shared data item. The copy is a "compiler-specified" shared data item that will be subject to the method 200 in the same manner as will be the programmer-specified shared data items.

These partial descriptions have previously been allocated by the compiler as described above when the user program is compiled. In one particular embodiment, the user program is implemented in the UPC programming language and this collection is performed by a combination of compiled code and the UPC Run-time System ("UPC RTS"). The UPC Run-time System retrieves the stored partially complete descriptions, including a set of descriptions of the names, sizes, and alignments required for the shared data items.

The method 200 next, as set forth in the box 220, dynamically allocates the shared data items into a local address space, e.g., the local, virtual address space 115 in FIG. 1, shared by a plurality of CPUs within a single node, as set forth in the box 220. Ordinarily this address space will be a "virtual" address space, as opposed to a "physical" address space, but this is not necessary to the practice of the invention. These addresses will subsequently be used to calculate the address of each specific shared data item referenced by the user program's source code during execution of the compiled code.

After the dynamic allocation, the method 200 then stores the allocated addresses into the descriptions of the shared data items during the run-time initialization as set forth in the box 230. Note that, at this point, the descriptions are no longer partially complete. More particularly, a copy of the description is stored by the OS in the private memory of each CPU 110. The method 200 subsequently determines the address of a shared data item from the stored allocation in the stored description, as set forth in the box 240. As those in the art having the benefit of this disclosure will appreciate, the determination of the address might occur for a variety of reasons. However, at some point, this determination will be made as part of a data access request. The method 200 then determines from the address whether the data request seeks to access data, i.e., the shared data item, available within the shared local address space, as set forth in the box 245. If the data is determined to be available in the local address space, the method 200 accesses the data from the local address space, as set forth in the box 250. Otherwise, if the data is determined to be unavailable in the local address space, the method 200 accesses the data from the proper remote location, as set forth in the box 260.

Figure 3A:
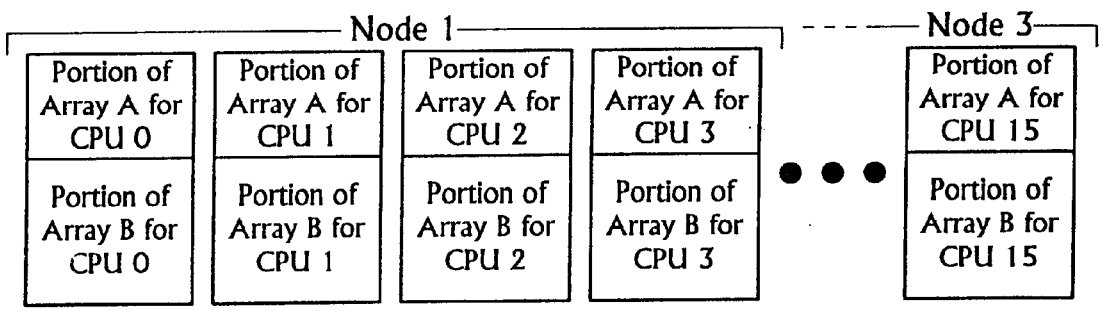
FIG. 3A and FIG. 3B conceptually illustrate the naive and optimized allocations for shared arrays named A and B running on the computing system of FIG. 1 depending on whether the computing system of FIG. 1 is configured and operating in accordance with the present invention.
Figure 3B:
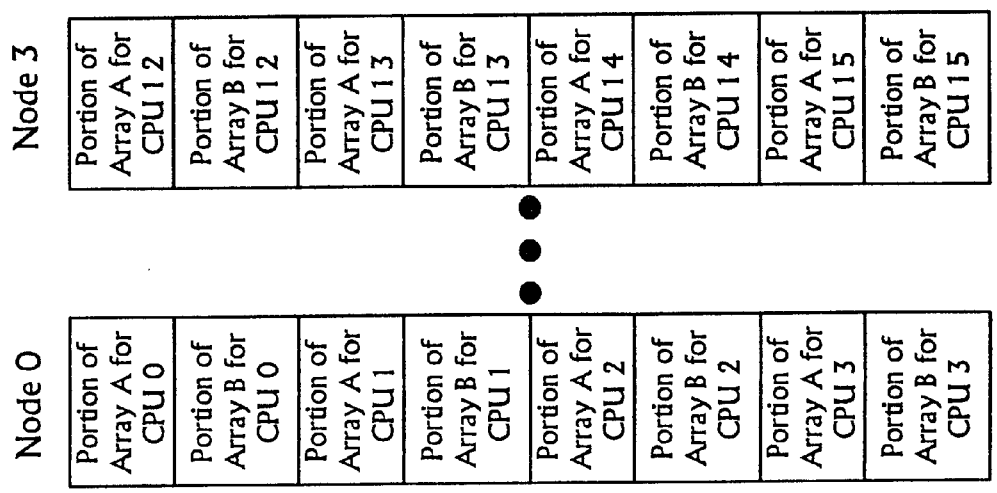

FIG. 3A shows the naive, or conventional, allocations for shared arrays named A and B running as they would be allocated on the cluster system 100 of FIG. 1 if the computing system 100 were operated in accordance with conventional practice. FIG. 3B shows the allocation of the same shared arrays on the cluster system configuration 100 shown in FIG. 1 in accordance with the present invention. The user program references both private memory associated with each processor and shared memory partitioned among all the CPUs. Only the shared memory portion is shown. Note that, in the illustrated embodiment, a virtual memory address space is employed.

Each shared array is distributed over the memory systems of all the SMP nodes in the cluster. In this example, each array A, B is distributed such that each of the 16 CPUs 110 has access to some fraction of each array A, B. In the naive allocation of FIG. 3A, the arrays A, B are partitioned in such a way that each CPU 110 has direct access, via the high-speed memory controller 120, to ¹⁄₁₆ of each array A, B. To access other portions of the arrays A, B, even those residing in the same shared memory 115, each CPU 110 using the allocation of FIG. 3A must communicate via the lower speed I/O bus 127 and the interconnect adapter 125, and perhaps the switch 135. Each fragment of the arrays A, B resides at the same virtual address in a different virtual address space, which is indicated in FIG. 3A by the fact that the individual fragments are separate, and do not share a common border.

In the optimized allocation of FIG. 3B, the same number of array fragments are allocated in the same order. However, all the fragments residing in the shared memory 115 of each node 105 are allocated together at distinct virtual addresses in a single virtual address space, and are directly accessible from all the CPUs 110 in a given node 105. In FIG. 3B, this property is shown by the fact that the adjacent fragments are lined up vertically, with fragment 1 for array A following fragment 0 for array B, etc. Other arrangements are, of course, contemplated. Thus, each CPU 110 now has direct access, via the high-speed memory controller 120, to ¼ of each array, or three times as much as with the naive allocation.

Since the compiled code for the user program is not aware of the geometry of the memory allocation scheme used, the run-time system must be responsible for not only performing the optimized allocation at program startup time, but also insuring that the proper memory location is accessed each time the compiled code makes a shared memory reference request for elements of arrays A or B.

The amount of performance increase any given implementation benefits from when using the optimized allocation depends on the number of nodes, the number of CPUs, the relative performance of direct accesses vs. switched accesses, the relative number of local vs. shared memory references, and the distribution of remote references among the CPUs for that application program. If the reference pattern for shared arrays is uniformly random, only a modest performance improvement may be possible. In this example of FIG. 3B, ¾ of the accesses still require the use of the slow switch, even with the optimized allocation for a random access pattern.

Regardless, significant benefits are still expected because the interconnect adapters 125 no longer service requests for values residing within the same node 105. However, for many applications, the pattern of shared accesses is skewed toward nearby parts of the arrays, rather than being random. In these applications, a much larger fraction of all accesses can be satisfied within the same node, and therefore the corresponding performance increase from the optimized allocation will be greater. Moreover, the availability of this optimized allocation encourages applications programmers to modify their applications so as to exploit this very performance increase, which is not possible with the naive allocation.

The disclosure above mentions one particular implementation several times. Several aspects of that implementation, as well as some additional aspects, are summarized below. Returning to FIG. 1, the computing system 100 of FIG. 1 is implemented as follows:

- the SMP nodes 105 are AlphaServer™ SMP Systems commercially available from Compaq Computer Corporation, such as the AlphaServer ES40 system or the GS 320 systems;
- the I/O bus 127 is a PCI I/O bus;
- the interconnect adapters 125 are Elan™ interconnect Adapters available from Quadrics Supercomputers World Corporation; and
- the switch 135 is an Elite™ switching system, also commercially available from Quadrics Supercomputers World Corporation.

Note that these are exemplary only, and other implementations known to the art may be employed if operated in accordance with the invention as disclosed herein. The computing system 100 employs the Tru64 UNIX OS commercially available from Compaq Computer Corporation. This particular implementation supports the UPC Programming language and the compiler is one developed to support the UPC programming language on AlphaServer SC computer systems, also commercially available from Compaq Computer Corporation, modified as described herein. However, any compiler suitable to a particular implementation may be used provided it is modified as described.

A given UPC user program to be run on the computing system of FIG. 1 need not be changed to exploit this particular implementation of the invention. The only user-visible indicator of the use of the invention is the need to specify the —smp_local option to the compiler when the UPC user program is compiled. The UPC compiler is modified so that, when the —smp_local option is used, arrays and scalars which are declared "shared" (and thus will participate in remote communications) are not allocated in the conventional way. Instead, the compiler provides a set of descriptions of the names, addresses, sizes, and alignments required for the data items which will participate in the shared memory communications operations to the UPC Run-time System ("UPC RTS") before the program starts running.

Some alternative embodiments might "always" implement the invention, ie., the compiler might automatically employ it instead of doing so upon the specification of an option. One reason for making it optional is that the smp-local method exploits a larger virtual memory (4 times the size, in FIG. 3A and FIG. 3B), than the naive method. If each thread of the user program is attempting to exploit more than ¼ of the available virtual address space (in FIG. 3A and FIG. 3B), then the invention will fail in its attempt to allocate the necessary combined virtual address space to achieve proper operation. Thus, the operational choice is given to the programmer at compile time —either the maximum virtual address space is available (naïve method), or higher performance is available, if the virtual address space made available by the OS is sufficient for the program to operate. Other, more or less automatic, methods, might also be chosen in alternative embodiments.

At startup time, after the compiled code for the individual modules have completed contributing their partial descriptors, the _UPCRTS_init( ) function in the UPC Run-Time System collects the descriptions of the data items, and uses the descriptions to allocate the items into a virtual address space shared with the other CPUs in the same node. This dynamic allocation uses the shmget( ) and shmat( ) allocation functions provided by the Tru64 Unix OS. Information from this allocation is retained in the memory of each CPU 105 for later use. More particularly, at start-up time, the _UPCRTS_init( ) function, in addition to its verification tasks, traverses the lists of partially complete shared data item descriptions and performs a linker-like allocation phase. This phase sums the sizes of the required shared objects and assigns a relative offset to each. In addition, the _UPCRTS_init( ) function determines the relative offsets of each thread within its node—this information is derivable from the Elan state provided at Elan start-up time, and is called its relative thread number.

After determining the sum of the local size of all the global and static shared objects declared by the program (called the super block size), the _UPCRTS init( ) function calls shmget( ) function (if it is the first processor in a given node) or the shmat( ) function (if it is not) to allocate or attach the shared memory region containing its shared data. Next, _UPCRTS_init( ) function initializes the shared object descriptions by summing the base address of its shared memory region with the relative offset it has calculated for each object. It then returns normally. When the compiled code needs the base address of a shared object, it retrieves the address from the appropriate field in the description, and can compute addresses for shared data in the normal way using these values. Later, whenever remote communication for shared data items is attempted, the data access functions (Get, Put) in the UPC Run Time System ("UPC RTS") use the addresses provided by the compiled code.

The data access functions (Get, Put), when invoked, examine each request to determine whether it is attempting to access data that is available within the local shared virtual address space. If so, the functions access the data by computing the proper local address, and making an ordinary memory reference into the shared virtual space. If not, the functions adjust the raw remote address to use the proper virtual address for the item at the remote target processor, and make the appropriate remote via the I/O bus and interconnect adapter.

More particularly, whenever a shared fetch or store is performed, the primary optimization occurs when the appropriate _UPCRTS_get( ) function or _UPCRTS_Put( ) function first examines the processor number of the target of the operation. The target virtual address is adjusted by the product of the relative thread number and the super block size. This adjusted address is the true virtual address of the target datum. If this virtual address is available in local shared memory for the current node, a direct reference (fetch or store) to this address is performed. If not, a normal Elan communication call is made.

Thus, the present invention improves performance for "remote memory" transactions. Portions of arrays declared to reside in "shared" memory are allocated in a separate virtual address space for each individual CPU. It can avoid making remote memory access requests, via the I/O bus and adapter whenever a data access request targets a CPU which happens to be connected to the originating CPU in the same SMP node. This has two significant consequences. First, the request takes place using ordinary local virtual memory reference instructions, which are typically 10 to 100 times faster. Second, by avoiding the use of the adapter for these cases, the available I/O bus and adapter bandwidth is preserved for truly remote references. The amount of benefit from the invention depends on the ratio of local, shared memory, and true remote references. Depending on the application and the hardware configuration used, the performance increase can be an order of magnitude from this optimization.

Although the invention can be applied to any language used for programming multiprocessor systems and multiprocessor computer system, a computer system meeting the following criteria will benefit from the present invention:

- computer nodes should be connected to shared memory in a Symmetric MultiProcessor system;
- compute nodes are connected by memory-to-memory interconnect hardware accessible to the user program generating requests for data access;
- the memory interconnect hardware and software allow the OS to determine the geometry of the SMP systems, e.g., which SMP systems are truly remote and which are within the same SMP node;
- source language for the user program allows the compiler to determine which data items are subject to shared memory communication operations;
- the OS provides a method for allocating memory such that the same virtual addresses can be used to directly address a given data item by the program running simultaneously all the CPUs in an SMP node, e.g., the shmget( ) and shmat( ) functions provided by Tru64™ Unix OS; and
- the Run time system provided to start the program running on each CPU has a method by which the compiled code can inform the run-time system of the data items, their size, granularity, and alignment, which might benefit from this invention.

Computer systems employing fewer than all, or none, of these criteria, will still benefit from employing the present invention, but to a lesser degree.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for allocating memory in a multiprocessing computing system including a plurality of nodes, the method comprising:
   collecting a plurality of partially completed descriptions of programmer-specified shared data items at program start-up time;
   dynamically allocating the shared data items into a local address space shared by a plurality of CPUs within each node;
   storing the address of the allocation into each partial description;
   determining from the stored allocation address in the stored descriptions a address of a shared data item;
   determining from the determined address whether a data request seeking to access the shared data item is seeking data available within the shared local address space
   accessing the data from the local address space if the data is determined to be available in the local address space; and
   accessing the data from a remote address space if the data is determined to be unavailable in the local address space.

2. The method of claim 1, further comprising compiling a user program to generate the partially completed descriptions of programmer-specified shared data items.

3. The method of claim 1, wherein collecting the plurality of descriptions of shared data items includes collection a plurality of descriptions including the name, size, granularity, and alignment of each of the data items.

4. The method of claim 1, wherein dynamically allocating the shared data items includes allocating the shared items upon detecting the geometry of the hardware configuration.

5. The method of claim 1, wherein storing the description of the allocation includes storing the description in the private memory of each CPU in a computing system.

6. The method of claim 1, wherein the address space is a virtual address space.

7. The method of claim 1, wherein the address is a virtual address.

8. A program storage medium encoded with instructions that, when executed by a computer, perform a method for allocating memory in a multiprocessing computing system including a plurality of nodes, the method comprising:
   collecting a plurality of partially completed descriptions of programmer-specified shared data items at program start-up time;
   dynamically allocating the shared data items into a local address space shared by a plurality of CPUs within each node;
   storing the address of the allocation into each partial description;
   determining from the stored allocation address in the stored descriptions a address of a shared data item;
   determining from the determined address whether a data request seeking to access the shared data item is seeking data available within the shared local address space
   accessing the data from the local address space if the data is determined to be available in the local address space; and
   accessing the data from a remote address space if the data is determined to be unavailable in the local address space.

9. The program storage medium of claim 8, wherein the encoded method further comprises compiling a user program to generate the partially completed descriptions of programmer-specified shared data items.

10. The program storage medium of claim 8, wherein collecting the plurality of descriptions of shared data items in the encoded method includes collection a plurality of descriptions including the name, size, granularity, and alignment of each of the data items.

11. The program storage medium of claim 8, wherein dynamically allocating the shared data items in the encoded method includes allocating the shared items upon detecting the geometry of the hardware configuration.

12. The program storage medium of claim 8, wherein storing the description of the allocation in the encoded method includes storing the description in the private memory of each CPU in a computing system.

13. The program storage medium of claim 8, wherein the address space is a virtual address space.

14. The program storage medium of claim 8, wherein the address is a virtual address.

15. A computer programmed to perform a method for allocating memory in a multiprocessing computing system including a plurality of nodes, the method comprising:

collecting a plurality of partially completed descriptions of programmer-specified shared data items at program start-up time;

dynamically allocating the shared data items into a local address space shared by a plurality of CPUs within each node;

storing the address of the allocation into each partial description;

determining from the stored allocation address in the stored descriptions a address of a shared data item;

determining from the determined address whether a data request seeking to access the shared data item is seeking data available within the shared local address space accessing the data from the local address space if the data is determined to be available in the local address space; and accessing the data from a remote address space if the data is determined to be unavailable in the local address space.

16. The programmed computer of claim 15, wherein the programmed method further comprises compiling a user program to generate the partially completed descriptions of programmer-specified shared data items.

17. The programmed computer of claim 15, wherein collecting the plurality of descriptions of shared data items in the programmed method includes collection a plurality of descriptions including the name, size, granularity, and alignment of each of the data items.

18. The programmed computer of claim 15, wherein dynamically allocating the shared data items in the programmed method includes allocating the shared items upon detecting the geometry of the hardware configuration.

19. The programmed computer of claim 15, wherein storing the description of the allocation in the programmed method includes storing the description in the private memory of each CPU in a computing system.

20. The programmed computer of claim 15, wherein the address space is a virtual address space.

21. The programmed computer of claim 15, wherein the address is a virtual address.

22. A computing system comprising:

a plurality of SMP nodes, each SMP node including:
  a plurality of CPUs; and
  a plurality of a private memories, one for each of the CPUs;

a memory space distributed across the SMP nodes and being shared by each of the CPUs; and a user program resident on the computing system that, when executed, performs the following method:
  collecting a plurality of partially completed descriptions of programmer-specified shared data items at program start-up time;
  dynamically allocating the shared data items into a local address space shared by a plurality of CPUs within each node;
  storing the address of the allocation into each partial description;
  determining from the stored allocation address in the stored descriptions a address of a shared data item;
  determining from the determined address whether a data request seeking to access the shared data item is seeking data available within the shared local address space;
  accessing the data from the local address space if the data is determined to be available in the local address space; and
  accessing the data from a remote address space if the data is determined to be unavailable in the local address space.

* * * * *